Sept. 27, 1966     S. A. MALTHANER     3,275,378
SPOKED VEHICLE WHEEL HAVING SELECTIVE SPACER
MEANS FOR AXIALLY POSITIONING A TIRE RIM Filed Aug. 3, 1964     2 Sheets-Sheet 1

INVENTOR.
Sylvester A. Malthaner.
BY
Harness, Dickey & Pierce
ATTORNEYS.

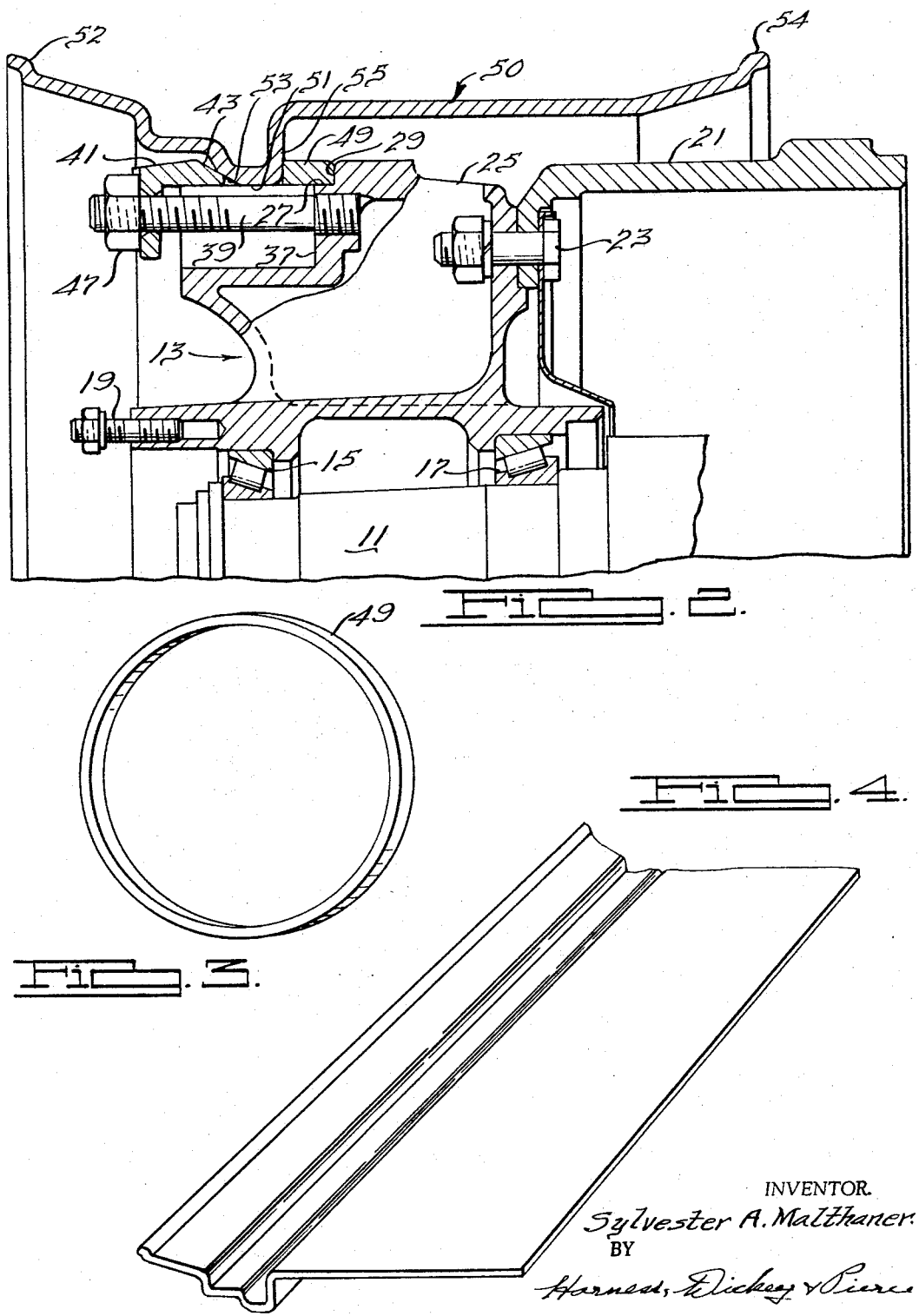

3,275,378
SPOKED VEHICLE WHEEL HAVING SELECTIVE SPACER MEANS FOR AXIALLY POSITIONING A TIRE RIM
Sylvester A. Malthaner, Rockford, Ill., assignor to Kelsey-Hayes Company, Romulus, Mich., a corporation of Delaware
Filed Aug. 3, 1964, Ser. No. 387,131
3 Claims. (Cl. 301—12)

This invention relates to automotive wheels, and particularly to an adjustable tire rim assembly.

Wheels for use on heavy buses, trucks, earth moving vehicles, and the like, ordinarily consist of a demountable rim carried on a cast wheel having a plurality of integral spokes. The rim is constructed from a strip steel which is first hot rolled at the mill and is subsequently cold formed, cut to length and welded end to end. The rim is formed with a radially inwardly extending annular shoulder positioned to abut radially outwardly extending shoulders on the wheel spokes. The wheel body, in turn, is mounted through a pair of spaced bearings on a conventional axle and a tire is mounted upon the rim in the usual manner.

To insure equal load distribution on the bearings in single tire wheel assembly and to maintain the wheel in a balanced condition, it is necessary that a transverse radial plane midway between the pair of bearings coincide with a midplane through the tire. However, in load transporting vehicles, it is customary to mount rims and tires of various widths on the wheels depending upon the load requirements of the vehicle.

In the past, each rim has been constructed so that when the radial shoulder thereon abutted the shoulders on a conventional wheel body, the tire and rim midplane would coincide with the plane midway between the wheel bearings, as set forth above. However, this has necessitated forming rims of different widths from different stock since, for each rim width, the distance between the rim shoulder and an adjacent rim edge would have to differ it the midplane of the tire is to be centered between the wheel bearings when the rim radial shoulder abuts the wheel shoulders. Consequently, manufacturing costs for these tire rims are relatively high.

The present invention contemplates wheel constructions of the above type wherein the various width tire rims may be formed from a common mill stock. The tire rims may be formed so that the radial shoulder is spaced from one side edge of the rim a predetermined distance. This distance may be chosen so that the rim midplane will coincide with the wheel bearing midplane for the smallest width rim when the rim shoulder abuts the wheel shoulders. For rims of greater width, a suitably sized spacer is inserted between the wheel and rim shoulders to achieve the alignment desired between the rim midpoint and the wheel bearing midplane. In this way, a plurality of rim sizes may be formed from stock having the rim shoulder the same distance from a given rim edge. This, in turn, permits these rims to be formed from the same roll or extruded stock. The rim may thereafter be trimmed to the desired axial width and cold formed at the other edge in the appropriate manner. Thus, production costs will be materially reduced for tire rims of this type and this will result in a substantial savings to the consumer.

It is therefore an object of the present invention to provide an improved automotive wheel assembly which permits a variety of rim sizes to be supplied from the same mill stock.

It is a further object of the present invention to provide an improved automotive wheel assembly of the above character which will substantially reduce wheel rim production costs.

It is a further object of the present invention to provide an improved automotive wheel assembly which permits simple and rapid conversion of different size tires and rims on a given wheel.

It is another object of the present invention to provide an improved automotive wheel assembly of the above character wherein the wheel rims are adaptable for use with a variety of spacer sizes.

It is still another object of the present invention to provide an improved automotive wheel assembly of the above character which is inexpensive to manufacture, rugged in construction and reliable in use.

These and other objects and advantages of the present invention will become more objects and advantages of the present invention will become more apparent from the following detailed description taken in conjunction with the drawings in which:

FIGURE 3 is an isometric view of a preferred form of spacer constructed according to the present invention;

FIGURE 4 is a perspective view illustrating rim strip stock as it emerges from a conventional rolling mill or extrusion die; and FIGURE 5 is an exploded fragmentary view of a wheel and spacer showing a modified form of spacer constructed according to the present invention.

Figure 1:
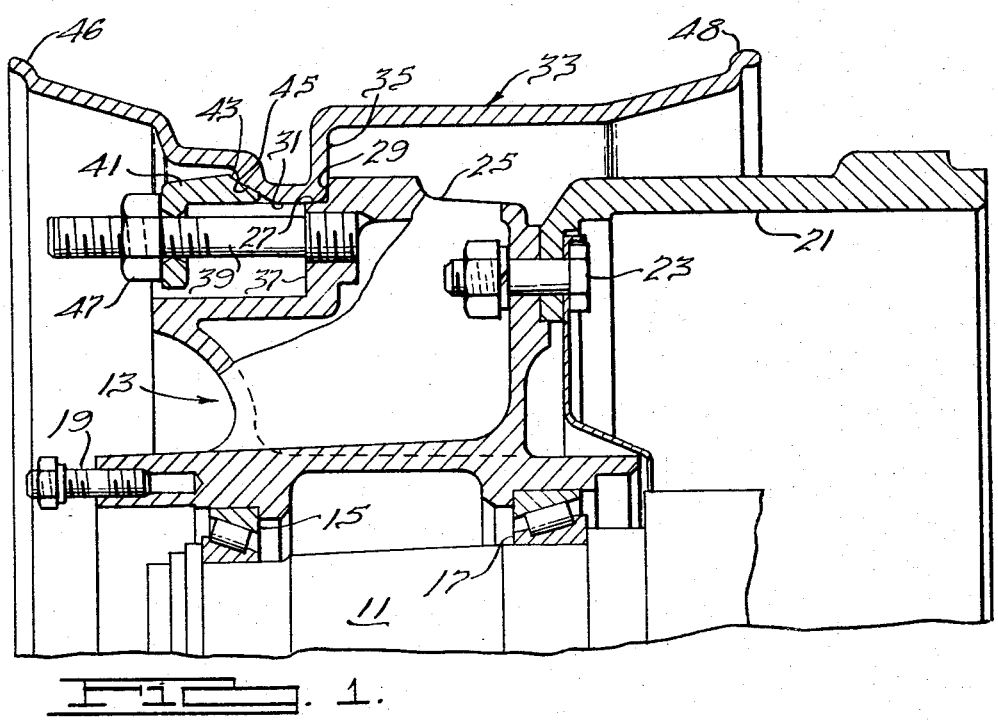
FIGURE 1 is a fragmentary sectional view of one type of automotive wheel assembly shown without the rim spacer of the present invention.

Referring now more specifically to the drawings, the wheel assembly depicted therein is seen to include an axle 11 and a conventional wheel spider 13 supported for rotation thereon by a pair of axially spaced cup-cone type bearings 15 and 17. A conventional hub cap (not shown) may be attached to one end of the wheel spider by suitable bolts 19 and a conventional brake drum 21 may be carried at the other end of the wheel spider in the usual manner by bolts 23.

The wheel spider 13 is formed as shown with a plurality of circumferentially spaced integral spokes 25 each of which has a segmentally circular cylindrical or acurate surface 27 and an adjacent radially extending locating shoulder 29 at its radially outer end. The surface 27 is designated to conform the inner periphery of an annular flange 31 integrally formed on the inner periphery of a conventional hot rolled annular tire rim 33. The surfaces 27 are arranged so that the rim 33 may be closely fitted over said surfaces. The center of curvature of the surfaces 27 and the axis of the rim 33, of course, lie on the axis of rotation of the wheel spider 13 as determined by the bearings 15 and 17. A radially extending annular shoulder 35 is formed at one end of the flange 31 and is positioned to abut the radial shoulder 29 on each of the spokes 25. A recess 37 is formed in each spoke 25 adjacent the outer periphery and outboard side thereof from which a threaded stud 39, secured to each spoke, projects axially ouwardly. A separate rim clamp 41, positioned partly within each recess 37, is slidably received on the stud 39 thereof. Each clamp 41 has an axially tapered arcuate wedge seat 43 adapted to engage a correspondingly tapered wedge surface 45 formed on the flange 31 opposite the shoulder 35. Thus, by adjusting each of the clamps in an inboard direction, the seats 43 will be brought to bear against the rim surface 45 and the shoulders 35 will abut the shoulder 29. A nut 47 is threaded on each stud 39 by which a clamping force is applied to each clamp 41. When each nut 47 is tightened, its adjacent clamp 41 will flex the adjacent portion of the rim 33 radially outwardly and securely clamp the rim against the locating shoulders 29. The rim is thereby securely clamped in place.

The tire rim 33 is designed of a width to receive thereon a particular sized tire (not shown) with its beads confined between a pair of tire retaining flanges 46 and 48 in the usual manner. From this, it will follow that the axial midpoint of the rim will also be the tire midpoint and in order to distribute the wheel load equally between the bearings 15 and 17, the rim axial midpoint should be positioned midway between the bearings 15 and 17. For a given tire and rim width the axial position of the rim shoulder 35 relative to the rim edges can be designed so that the rim and wheel bearing axial midpoints will coincide. However, different tire sizes have differing axial widths and require corresponding different width tire rims. Ordinarily then, in order to keep the load distributed equally between the bearings, the position of the shoulder 35 on the tire rims relative to a given rim edge should vary according to the rim width. Thus, for wider rims the position of the shoulder 35 would be positioned further inboard of the retaining flange 46 a distance equal to half the increase in rim width. This, in the past has required the rim manufacturer to form each rim of differing width from stock of a different cross-sectional shape, which has in turn established rim production costs at a relatively high level. On the other hand, rim production costs can be materially reduced if the various sized tire rims could be fabricated from just one stock of rolled or extruded strip material and it is to this end that the present invention is directed.

Thus, according to the present invention, the tire rim 33 is formed from a length of rolled or extruded stock preferably with the tire retaining flange 46 along one edge and the flange 31 and shoulder 35 in the as-formed condition. This stock can then be trimmed to the desired width along the edge opposite the flange 46. Thereafter, the tire retaining flange 48 can be cold formed and the stock butt welded end to end in the usual manner.

The tire rim 33 depicted in FIGURE 1 is designed of an axial length so that the rim midplane will coincide with the wheel bearing midplane when the shoulders 35 and 29 abut, and this condition will preferably exist for the smallest rim width to be used with a particular wheel. For larger rim sizes cut from the same original mill stock, the rim midplane would be axially inboard of the bearing midplane since the rim flange 31 and shoulder 35 would be the same distance from the preformed tire retaining flange 46. In order to compensate for this, the present invention includes providing a suitably sized spacer adapted to be positioned between the shoulders 29 and 35. This spacer will necessarily be of an axial dimension equal to one-half the increase in width of the larger rim over the smallest rim width. This then will reposition the rim midplane to coincide with the wheel bearing midplane and will establish the load balance condition in the tires as set forth above.

Figure 2:
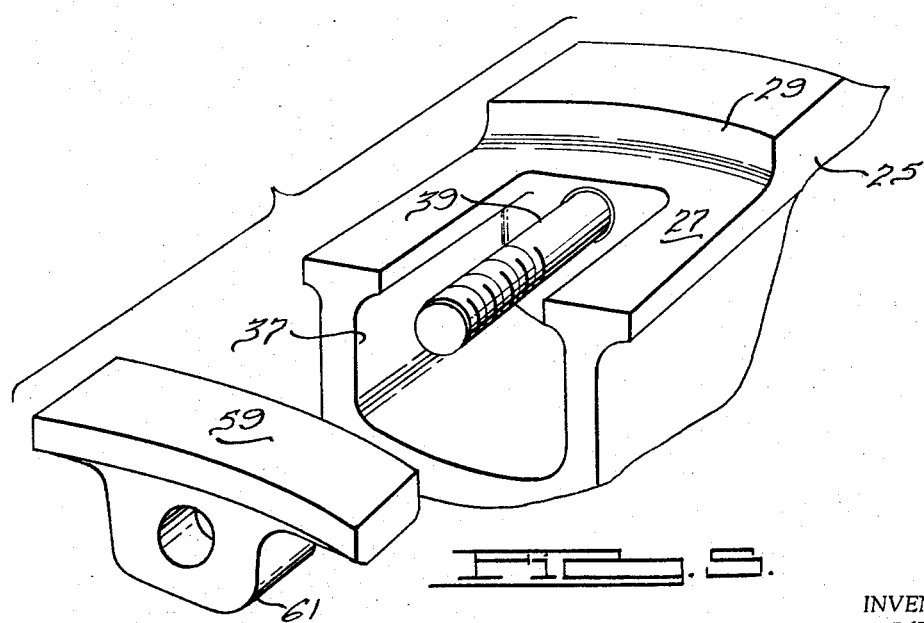
FIGURE 2 is a view similar to FIGURE 1 showing a spacer constructed according to the present invention.

FIGURES 2 and 3 depict the use of a larger rim 50 identical with the rim 33 of FIGURE 1 except in width and which is mounted upon the same wheel as shown in FIGURE 1 and illustrates a preferred form of the inventive concept. An annular spacer ring 49 having an inner diameter surface closely received on the arcuate surfaces 27 of spokes 25 is positioned between the shoulder 29 and a shoulder 55 which corresponds to shoulder 35 of rim 33. The axial length of spacer 49 is chosen so that the midpoint between the axial ends of the rim 50 coincides with the midpoint between the wheel bearings 15 and 17 and is therefore equal to one-half the difference between the axial dimensions of the rims 33 and 50.

The rim 50 is also formed with an annular inwardly extending flange 51, a tapered wedge surface 53, and tire bead retaining flanges 52 and 54, which are identical to flange 31, wedge surface 45, and retaining flanges 46 of rim 33. The radial shoulders 35 and 55 are, as set forth above, spaced the same distance from the outboard tire retaining flanges 46 and 52 of their respective rims 33 and 50 since these rims are formed from the same mill stock. The distance between shoulders 35 and 55 and the inboard tire retaining flanges 48 and 54 of their respective rims 33 and 50 differ, however, according to differing rim widths.

FIGURE 4 illustrates a conventional rim strip stock used in constructing wheel rims as it emerges from the rolling mill or the extrusion die. This stock may be rolled or extruded in predetermined lengths or in indefinite lengths and later cut to size. In each case, whatever additional forming steps are needed to complete the cross-sectional rim contour are then effected and the rim ends joined as by butt welding. Thus, for reasons of economy, it is desirable not only to minimize the number of additional forming steps needed but also to use a single mill stock in constructing a maximum variety of rim widths.

The typical mill stock illustrated in FIGURE 4 requires only trimming the unformed edge to the desired width and the inboard tire retaining flanged portion 48 or 54 along this rim edge since the shoulder 35 or 55 and the outboard tire retaining flange 46 or 52 are formed during rolling or extruding. As set forth hereinabove, the rim shoulder 35 or 55 is spaced a given distance from the outboard tire retaining flange 46 or 52 so that for the smallest rim width the rim center will coincide with the midpoint between the wheel bearings when the rim and wheel shoulders abut. Thus, wider rims formed and cut from the same stock may be mounted on the same wheel but with a suitably sized spacer interposed between the wheel and rim shoulders.

FIGURE 5 illustrates a modified form of rim spacer for use as above. In this form, a plurality of suitably dimensioned segmental spacers 59 are positioned, one on each of spokes 25. Each of the spacers may be formed with an integral mounting portion 61 adapted to be positioned within recess 37 and to slidably receive stud 39 and will function in a manner identical with spacer 49.

Thus, it will be apparent from the above description that by the present invention, a simple but effective and reliable automotive mounting assembly has been provided which will materially reduce rim production costs by permitting a variety of rim widths to be constructed from a single stock.

While preferred forms of the invention have been illustrated and described in detail hereinabove, various additions, substitutions, modifications or omissions may be made thereto without departing from the spirit of the invention encompassed by the appended claims.

What is claimed is:

1. An automotive wheel rim and spacer assembly for an automotive tire including a wheel supported upon an axle by a pair of axially spaced wheel bearings for rotation about a central axis, said wheel having a plurality of radially extending spokes, each of which is formed with an outwardly facing axially extending rim supporting surface and a shoulder extending substantially perpendicular to said rotational axis; an annular rim having an axially extending surface at an intermediate portion spaced inwardly of its edges and adapted to fit closely but slidably on said axial surfaces of said spokes and having a shoulder extending substantially perpendicular to said rotational axis positioned to face said shoulders on said spokes, a plurality of selected spacer means adapted to be positioned one between each said spoke shoulder and said shoulder on the rim, said spacer means each having a pair of shoulders extending substantially perpendicular to said rotational axis and adapted to seat against the shoulders on said rim and spokes, respectively, and provided with a dependent portion removably secured to a respective one of said spokes, clamping means having a portion adapted to seat on said spoke axial surfaces and provided with a tapered surface adapted to engage a tapered surface on said rim and bolt means securing said clamping means to each said spoke for clamping said rim on said wheel.

2. An assembly as defined in claim 1 wherein each said spacer dependent portion has an axially extending opening receiving a respective one of said bolt means.

3. An assembly as defined in claim 1 wherein said generally radially extending surfaces on each said spoke and said rim extend outwardly and inwardly, respectively.

References Cited by the Examiner

UNITED STATES PATENTS

| | | | |
|---|---|---|---|
| 1,593,886 | 7/1926 | Swain | 301—20 |
| 1,956,428 | 4/1934 | Swain | 301—13 |
| 2,023,404 | 12/1935 | Burger | 301—12 |
| 2,135,481 | 11/1938 | Brink | 301—12 X |
| 3,160,442 | 12/1964 | Walther | 301—12 |
| 3,186,767 | 6/1965 | Walther | 301—10 |

BENJAMIN HERSH, *Primary Examiner.*

R. J. JOHNSON, *Assistant Examiner.*